March 9, 1971

M. K. HARRIS 3,568,444

REGENERATIVE-RECOMPRESSION-REHEAT VAPOR
CYCLE METHOD FOR POWER PLANTS
Filed June 26, 1969

INVENTOR.
MARION K. HARRIS
BY
ATTORNEYS

United States Patent Office 3,568,444
Patented Mar. 9, 1971

3,568,444
REGENERATIVE-RECOMPRESSION-REHEAT VAPOR CYCLE METHOD FOR POWER PLANTS
Marion K. Harris, 14737 Charmeran Ave., San Jose, Calif. 95124
Filed June 26, 1969, Ser. No. 836,888
Int. Cl. F01k *19/04*
U.S. Cl. 60—65                              13 Claims

ABSTRACT OF THE DISCLOSURE

A method of operating a vapor cycle power plant, e.g. a steam power plant, including steps of regeneration, recompression and reheating to increase the net work output and efficiency.

BACKGROUND OF THE INVENTION

The present invention relates to vapor cycle power plants and more particularly to the vapor cycle of such plants.

The present invention is highly applicable to automotive propulsion. Presently, the fuel economic costs for internal combustion engine automobiles are high and the atmospheric pollutants generated by such automobiles highly undesirable. Accordingly, it is desirable to provide a power plant of a size applicable for powering automobiles which power plant contributes little or no pollutants to the atmosphere and is economical to operate while maintaining a high degree of operational efficiency.

SUMMARY OF THE INVENTION

The present invention pertains to a vapor cycle process for a power plant wherein a combination of thermodynamic processes of changing the pressure or/and temperature or/and volume of a working substance are included within one complete cycle. The complete cycle may include intermediate regenerative, recompression and reheat steps. The complete cycle efficiency exceeds that of the Rankine cycle and approaches that of an internal combustion engine with minimal atmospheric pollutants. The net work output is increased while maintaining temperature limitations such that there is no substantial increase in input temperature or substantial decrease in rejection temperature.

In an exemplary embodiment, water in its various liquid, "wet steam" or superheat states throughout its cycle is the working substance. The steady flow process steps include: pumping liquid feed water to a boiler; heating the water to a superheated steam state; high pressure expansion extracting output work; regeneratively heating the liquid feedwater; recompressing the working substance; reheating the working substance to superheat condition; a second intermediate pressure expansion extracting output work; re-regeneratively heating the feedwater; re-recompressing the working substance; re-reheating the working substance to superheat condition; a third low pressure expansion extracting output work; and condensing the working substance to reject heat and return it to its initial condition.

Proper balance amongst the regenerative, recompression and reheat process controls determines the pressure and temperature points of the steam at the commencement points of the expansion steps. Thus, the output work may be divided equally among the three cylinders. The expansion ratio in all cylinders may be the same therefore allowing for a common cut-off point and a common inlet valve-actuating mechanism to be used for all cylinders.

The recompression step may follow or precede regeneration or follow or precede reheating. The exact sequence is not necessarily fixed. Also, the regenerative steps may be omitted and/or the engine reduced from triple expansion to a compound engine with an accompanying reduction in cycle efficiency.

DESCRIPTION OF THE PREFERRED EMBODIMENTS

Figure 1A:
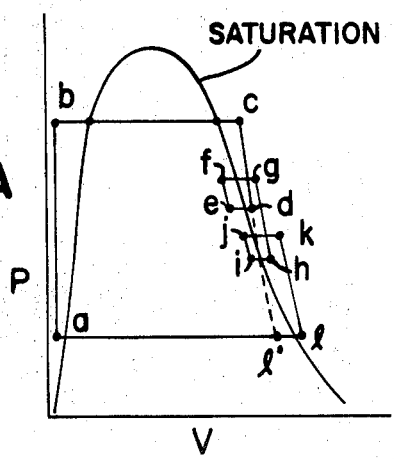
FIGS. 1A and 1B illustrate respectively theoretical pressure (P)-volume (V) and temperature (T)-specific entropy (S) diagrams of the complete cycle of the present invention.
Figure 1B:
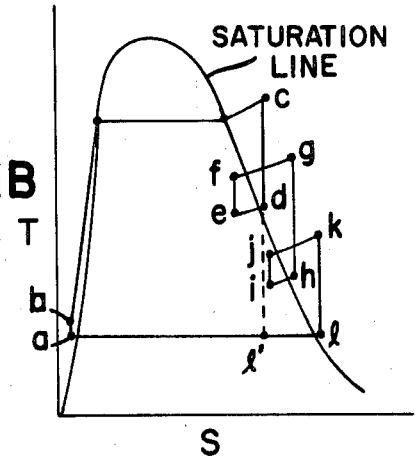

The theoretical steam power cycle incorporating various thermodynamic processes in combination according to the present invention is diagrammatically illustrated in FIGS. 1A and 1B which are somewhat expanded for illustrative purposes. Viewing the diagrams, there is illustrated P–V and T–S diagrams for a triple expansion power plant using the complete cycle and illustrating changes in the pressure and/or temperature and/or volume during the various thermodynamic processes. The area within the P–V cycle-diagram may be viewed as equaling mechanical work in foot-pounds and the area within the T–S cycle-diagram as equivalent energy in thermal units. The steady flow processes or steps each convert the working substance to a different pressure-volume and temperature-entropy state. The various steps of the cycle include: a pumping of the liquid (water) step $a$–$b$ to increase the pressure to a value of approximately 1000 p.s.i.a. (pounds per square inch absolute) followed by an isobaric step $b$–$c$ expanding and heating the steam to a superheat condition at approximately 800° F. This places the steam cycle at point $c$ coinciding with relative high pressure and high temperature. A reversible adiabatic expansion step $c$–$d$ follows resulting in the extraction of external work from the working substance. This results in a decrease in temperature and pressure. A step $d$–$e$ of the steam follows to accomplish regenerative heating of the input feedwater by the vapor exhaust. The point $e$ may fall in the wet steam (steam containing intermingled moisture, moist or spray) region within the saturation line, may stop in the region of superheat outside the saturation line, or may stop on the saturation line. A recompression step $e$–$f$ to increase pressure and temperature of the steam follows. Then an isobaric reheat step $f$–$c$ follows to heat the vapor to the superheat region. This places the steam cycle at point $g$ coinciding at an intermediate pressure and temperature level less than that of point $c$, with the volume exceeding that of point $c$. A second reversible adiabatic expansion step $g$–$h$ follows resulting in the extraction of external work from the working substance. This results in a decrease in temperature and pressure. The length of the step $g$–$h$ may coincide with the length of $c$–$d$. A step $h$–$i$ of the steam follows to accomplish re-regenerative heating of the input feedwater by the exhaust vapor. Like the point $e$, the point $i$ may fall within, on or without the saturation line. A second adiabatic recompression step $i$–$j$ follows to increase temperature and pressure. An isobaric expansion re-heat step $j$–$k$ follows placing the cycle at point $k$ in the super heat region. The point $k$ is of low pressure and temperature relative to points $c$ and $g$, at which the first and second work steps commenced. A third reversible adiabatic expansion step $k$–$l$ follows resulting in the extraction of external work. This results in a further decrease in pressure and temperature to the working substance to a value substantially coinciding with that of point $a$. The working substance exhaust is then cooled or condensed to reject heat and return it to a pressure-temperature-volume state substantially coinciding with point $a$. The length of the step $k$–$l$ substantially coincides with that of lines $c$–$d$ and $g$–$h$ so that the work may be equally divided between the three work steps with substantially the same expansion ratio for each step.

As illustrated, proper balance between the compression steps, the two reheating steps and the two regeneration steps control the staring and stop points of the work steps $c$–$d$, $g$–$h$ and $k$–$l$. Ideal cycle efficiencies as high as 28% may be calculated using pressure and temperature at the high pressure point $c$ of no higher than approximately 1000 p.s.i.a. at approximately 1000° F. and pressure and temperature at rejection to the condenser of 50 p.s.i.a. and 280° F., with an ideal steam consumption rate calculated to be 7.0 pounds per horsepower-hour. This compares with approximately 10.85 pounds per horsepower-hour for a good present automotive type steam power plant. In viewing FIGS. 1A and 1B and extending the lines $c$–$d$ it becomes evident that the individual intermediate cycles increase the overall area compared to that if the external output work were taken at once directly from point $c$ to point $l'$. At the same time, the temperature-pressure limitations are maintained.

Figure 2:
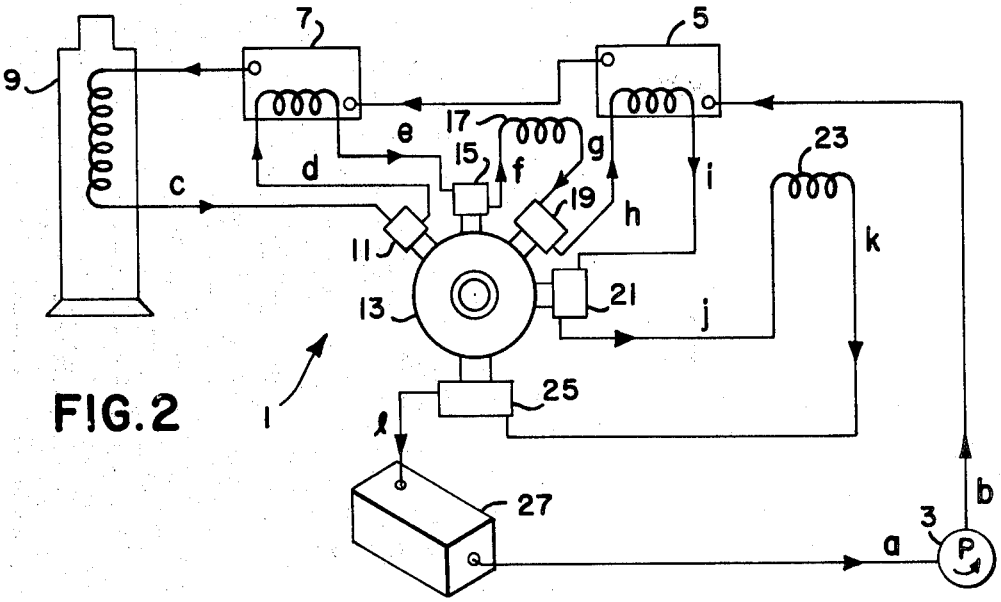
FIG. 2 is a schematic diagram of a three-stage steam piston engine power plant operating on the complete cycle of the present invention.

The three-cycle steam piston engine power plant of FIG. 2 referred to by the general reference character 1 includes the process steps of the present invention. Pumping of the feedwater of step $a$–$b$ is accomplished by means of a feedwater pump 3. The heating step $b$–$c$ is realized by means of a plurality of heaters 5, 7 and 9. The heater 9 is in the form of a boiler-superheater to place the steam in the superheat region. The first output work step $c$–$d$ is realized through a high pressure cylinder 11 of a steam engine 13. Within the cylinder 11 some of the heat energy of the steam working substance is transmitted to the engine and partly converted to mechanical work. The working substance is therein "let down" to lower temperature and pressure.

The second cycle includes the regenerative step $d$–$e$. In order to increase overall efficiency, as steam is exhausted by the steam engine 13, heating of the input feedwater is realized in part by passing the exhaust through the regenerative feedwater heater 7. The first cycle exhaust steam serves as the heating element with heat being transferred to the input feedwater. The recompression step $e$–$f$ is realized by means of recompression cylinder 15 of the engine 13 while the reheat step $f$–$g$ is realized by passing the vapor through a heater 17 which may be part of the boiler-superheater 9. The second work output step $g$–$h$ is realized through an intermediate pressure cylinder 19 of the engine 13.

The third cycle including the exhaust-re-regenerative step $h$–$i$ is realized by means of exhaust of steam by the engine 13. The exhaust steam passes through the regenerative feedwater heater 5. The second cycle exhaust steam serves as the heating element with heat being transferred to the input feedwater. The re-recompression step $i$–$j$ is realized by means of a recompression cylinder 21 of the engine 13. The re-reheat step $j$–$k$ is realized by means of a heater 23 which may be part of the boiler-superheater 9. The third work output step $k$–$l$ is realized through a low pressure cylinder 25 of the engine 13. The point $l$ may substantially coincide in pressure and temperature to point $a$. The step $l$–$a$ of cooling the vapor and returning it to its initial state is realized by processing the vapor through a condenser 27. The engine 13 may be designed such that the points $d$, $h$ and $l$ are all selected so that the line $c$–$d$, line $g$–$h$ and line $k$–$l$ are of equal length to provide smooth operation.

Figure 3:
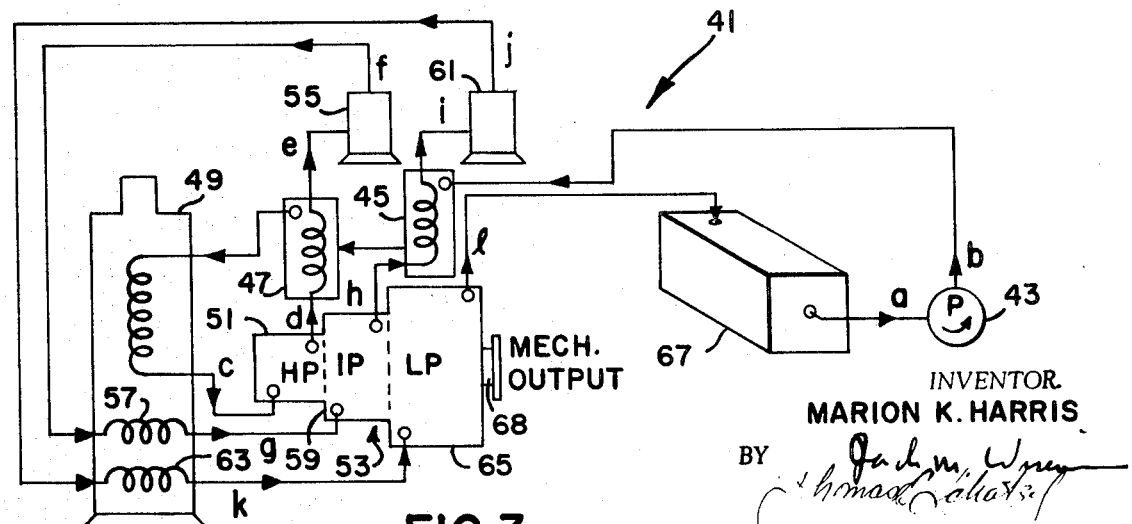
FIG. 3 is a schematic diagram of a three-stage steam turbine power plant operating on the complete cycle of the present invention.

The three stage turbine power plant of FIG. 3, referred to by the general reference character 41, includes the process steps of the cycle of the present invention. Step $a$–$b$ is accomplished by means of a feedwater pump 43. The heating step $b$–$c$ is realized by means of a plurality of heaters 45, 47 and 49. The heater 49 is in the form of a boiler superheater to place the steam in a superheat region. The output work step $c$–$d$ is then realized through a high pressure cylinder 51 of a steam turbine 53.

The second cycle includes the common exhaust-regenerative step $d$–$e$ in which steam is exhausted by the turbine 53. To increase overall efficiency, heating of the feedwater is realized in part by means of the regenerative feedwater heater 47. The recompression step $e$–$f$ is realized by means of a compressor 55 while the reheat step $f$–$g$ is realized by passing the vapor through a reheater 57 which may be a part of the boiler-superheater 49. The second work output step $g$–$h$ is realized through an intermediate pressure cylinder 59 of the turbine 53.

The third cycle includes the re-regenerative step $h$–$i$ in which steam is exhausted from the cylinder 59 of the engine 53. To increase the overall efficiency, heating of the input feedwater is realized in part by means of the regenerative feedwater heater 45. The re-recompression step $i$–$j$ is realized by means of a compressor 61. The re-reheat step $j$–$k$ is realized by means of a heater 63 which may be part of the boiler-superheater 49. The third work output step $k$–$l$ is realized through a low pressure cylinder 65 of the turbine 53. The step $l$–$a$ of cooling the vapor and returning it to its initial state is realized by processing the vapor through a condenser 67. Output work may be taken off a drive shaft 68.

As shown, proper balance among the regenerative, recompression and reheat controls of the power plants 1 and 41 may be selected to divide the work equally among the three output work steps. This is of substantial significance in a piston engine having a fixed stroke and where smooth operation is desired. The physical dimensions of the cylinders of the engine or turbine may be selected so as to all have the same expansion ratio and therefore in the case of the piston engine the same cut off. The cylinders in the case of the engine 13 may have a common inlet valve actuating mechanism. It may be further noted that on the diagrams of FIGS. 1A and 1B, the points of exhaust $d$, $h$ and $l$ remain in the superheat region. Though this is not absolutely necessary it is desirable in some instances. For example, with a turbine application, if expansion continues into the "wet region" water droplets may form and cause erosion. In the case of a piston engine, the engine operates more efficiently if at the steam exhaust point the working substance contains some superheat. As previously indicated, if "wet steam" is not desired, e.g. erosion of the valves or blades is of concern, the exhaust-regenerative steps $d$–$e$ and $h$–$i$ may be selected so as to terminate on the saturation line or in the superheat region.

What is claimed is:

1. A method of operating a vapor cycle power plant comprising the steps of:
   pumping an input working substance of a first pressure-temperature-volume state to convert the medium to a second pressure-temperature-volume state of desired values;
   heating the medium to convert the substance to a third pressure-temperature-volume state;
   a first expansion of the substance at the third state for realizing external work and decreasing the pressure and temperature state;
   exhausting and recompressing at least part of the substance to convert the medium to a fifth pressure-temperature-volume state;
   reheating the substance to superheat conditions of a sixth pressure-temperature-volume state; and
   a second expansion of the substance for realizing external work and decreasing the pressure and temperature to convert the substance to a seventh pressure-temperature-volume state.

2. The method of claim 1 in which the working substance is regenerated to heat the input working substance.

3. The method of claim 1 further including:
   exhausting and re-recompressing the substance to an eighth pressure-temperature-volume state;
   re-reheating the substance to a ninth pressure-temperature-volume state; and
   a third expansion of the substance for realizing external work and decreasing the pressure and temperature to convert the medium to a tenth pressure-temperature-volume state.

4. The method of claim 3 in which the medium undergoes regenerative heat transfer after each of the first and second expansions to heat the input working substance.

5. The method of claim 4 in which the first, the second and the third expansions are controlled to result in an equal amount of work.

6. The method of claim 5 in which the first, the second and the third expansions are all performed under superheat pressure-temperature states.

7. The method of claim 6 in which the working substance is regenerated each time under superheat states.

8. The method of claim 1 in which the steps are in the following sequence:
   pumping of the input working substance, heating the working substance, expanding the substance for a first time, recompressing the substance, reheating the substance and expanding the substance for a second time.

9. The method of claim 8 in which the input working substance is regenerated by the working substance to heat the input working substance after expanding the substance for the first time.

10. The method of claim 3 in which the steps are in the following sequence:
    pumping of the input working substance, heating of the working substance, expanding the substance for a first time, recompressing the substance, reheating the substance, expanding the substance for a second time, re-recompressing the substance re-reheating the substance, expanding the substance for a third time.

11. The method of claim 10 in which the input working substance is regenerated by the working substance to heat the input working substance after expanding the substance the first and second times.

12. A method as claimed in claim 1 in which said medium is heated to a superheat condition to the third pressure-temperature volume state.

13. A method as claimed in claim 3 in which said medium is heated to a superheat condition to the third pressure-temperature volume state and said substance is reheated to a superheat condition to the ninth pressure-temperature volume state.

References Cited
UNITED STATES PATENTS 1,601,384   9/1926   Vianello _____ 60—92

MARTIN P. SCHWADRON, Primary Examiner
A. M. OSTRAGER, Assistant Examiner

U.S. Cl. X.R.

60—73, 104